United States Patent [19]

Cargle

[11] Patent Number: 4,592,931

[45] Date of Patent: Jun. 3, 1986

[54] METHOD FOR SOIL STABILIZATION AND FUGITIVE DUST CONTROL

[75] Inventor: Virgil H. Cargle, Houston, Tex.

[73] Assignee: Exxon Research & Engineering Co., Florham Park, N.J.

[21] Appl. No.: 639,894

[22] Filed: Aug. 10, 1984

Related U.S. Application Data

[63] Continuation-in-part of Ser. No. 518,023, Jul. 28, 1983, abandoned.

[51] Int. Cl.$^4$ ................................................ B05C 1/16
[52] U.S. Cl. ................................. 427/136; 106/900; 405/264; 427/385.5; 427/421
[58] Field of Search .................. 252/174.24, 174.21, 252/180; 427/136, 421, 385.5; 405/264; 106/900

[56] References Cited

U.S. PATENT DOCUMENTS

| | | | |
|---|---|---|---|
| 3,578,589 | 5/1971 | Hwa et al. | 252/180 |
| 3,772,893 | 11/1973 | Eilers | 405/264 |
| 3,832,229 | 8/1974 | Du Brow et al. | 427/136 |
| 3,876,576 | 4/1975 | Michalski | 524/521 |
| 3,900,611 | 8/1975 | Corbett et al. | 427/214 |
| 4,001,033 | 1/1977 | Anthone | 106/315 |
| 4,072,020 | 2/1978 | Bishop | 405/264 |
| 4,089,830 | 5/1978 | Tezuka et al. | 404/76 |

Primary Examiner—Sadie L. Childs
Attorney, Agent, or Firm—R. L. Graham

[57] ABSTRACT

A method of enhancing the geotechnical properties of soil materials so as to control soil erosion including fugitive dust by treating the soil with a mixture of polyacrylic acids or polyacrylates, a dibasic acid or acid salt and a wetting agent in water utilizes an aqueous solution of a polyacrylate emulsion, (said active polymer having a $\overline{M}w$ of 1-5 million), sodium citrate and a surfactant (nonylphenol plus 10 moles ethylene oxide). The mixture is applied directly to the soil to be stabilized in either diluted or undiluted form whereby surface erosion in both quiescent areas and road beds can be controlled.

11 Claims, No Drawings

METHOD FOR SOIL STABILIZATION AND FUGITIVE DUST CONTROL

This is a continuation In Part of U.S. Pat. Application Ser. No. 518,023 filed July 28, 1983, now abandoned.

FIELD OF THE INVENTION

The present invention relates to dry dusty soil surface treatment and more particularly pertains to the stabilization of surface soil by application of an aqueous emulsion of a polymer to provide a relatively hard, compact surface layer which will not be blown away and will have increased resistance to erosion.

BACKGROUND OF THE INVENTION

In the field of soil stabilization by the control of fugitive dust, it has been the general practice to employ any number of techniques to minimize soil erosion, blowing and loss of support strength. These include soil conservation such as sowing with rapid growth grasses, ground coverings including plastic or metal mats and plastic sheet membranes, storm fences and conventional compacting and, finally paving with concrete or asphalt. these methods have proved unsatisfactory. Seeding grass requires an extensive growing period and is not suitable for all soils. The use of mats or membranes is ineffective due to warping and curling of the edges. Compacting and paving are both expensive and time consuming.

A wide variety of chemicals such as magnesium chloride, calcium chloride, asphalt emulsions, petroleum residues, lignosulfonates (see U.S. Pat. No. 4,001,033) and synthetic polymers have been used to treat the soil surface in order to prevent wind and water erosion and thereby control fugitive dust. Included among the synthetic polymers are the polyacrylates, polyacrylic acids and partially hydrolyzed polyacrylamides. U.S. Pat. No. 3,900,611 describes an aqueous solution of a polymer and a surface active agent which can be used as a dust control agent, primarily in confined spaces. The polymer is a high molecular weight (preferably 1-15 million) partly hydrolyzed polyacrylamide, a polyacrylate, or a copolymer of the two.

In U.S. Pat. No. 3,696,621 consolidation of dusty soils, especially for building of roads is said to be attained by alternate spraying of aqueous solutions of polyethylene oxide and polyacrylic acid. In U.S. Pat. No. 3,763,072 an aqueous latex emulsion of an acrylate ester polymer and an aqueous sodium silicate, optionally in the presence of a wetting agent, is used to treat soil for dust and erosion control. Polyacrylic acid and its salts are among the polymers which are claimed in U.S. Pat. No. 3,876,576 to be useful in aqueous systems for spraying mineral solids to stabilize their surfaces against erosion; however, the polymer's function is to control the drifting of the resinous binders, which are primarily natural or synthetic rubbers, rather than providing dust control.

An object of the present invention is to provide an inexpensive, simple, reliable and effective means to stabilize fine dusty soil surfaces.

Another object is to provide a method for the treatment of dry dusty soil in situ and stabilize the same to a hardness that will enable it to support light vehicle traffic.

A further object is to provide a technique for stabilizing soil substrate suitable for road building and land fill operations.

Other objects and many of the attendant advantages of this invention will be readily appreciated as the same becomes better understood by reference to the following detailed description.

SUMMARY OF THE INVENTION

It has been discovered that an aqueous mixture of a copolymer of ethylacrylate and methacrylic acid, sodium citrate and an ethoxylated nonyl phenol (a surface active agent capable of wetting soil particles) sprayed onto the surface of a road markedly stabilized its surface whereby fugitive dust is effectively controlled while increasing the unconfined compressive strength of the road soil affected by said spraying.

In accordance with this invention there is provided a concentrate which can be used to treat soil for erosion and fugitive dust control thereof which comprises an aqueous mixture of (a) acrylic polymers, i.e. homopolymers and copolymers of acrylic acid and salts thereof having a weight average molecular weight ($\overline{M}w$) ranging from 5,000 to about 30 million, preferably about 1-5 million; (b) a polybasic acid such as citric acid including salts thereof, preferably sodium citrate; and if desired (c) a wetting agent capable of wetting said soil and preferably an ethoxylated nonyl phenol, said homopolymers and copolymers of (a) having a weight ratio based on the weight of (b) ranging from 2 to 50 with the balance of the concentrate being water in an amount which ranges from 80 to 99.9 weight percent of the total concentrate.

The concentrate can be diluted into a soil treating composition comprising an aqueous mixture of: (a) homopolymers and copolymers of acrylic acid and salts thereof having a weight average molecular weight ranging from 5,000 to about 30 million; (b) a polybasic acid including salts thereof; and if desired (c) a wetting agent, said homopolymers and copolymers of (a) having a weight ratio based on the weight of (b) ranging from 2 to 50, said water being from 90 to 99.9 weight percent of the total composition. The formulation can be readily distributed into the soil s by spraying or intimately mixing and thereby achieving effective stabilization of said soil thereby controlling its surface erosion against both weather and vehicular surface erosive forces.

DETAILED DESCRIPTION OF THE INVENTION

In areas and terrain where the soil is dry, the small particulates on the surface are subject to rapid movement and displacement under the action of air movements that are generated naturally or by vehicular traffic. It results in soil erosion as well as dust clouds which are bothersome and irritating to personnel traveling across the terrain. The result of this invention is that the fugitive dust and/or erosion is controlled if not fully abated by stabilization of the surface of the soil through the action of the aqueous mixture of the invention distributed onto and into the soil surface.

As earlier expressed, the mixture of the invention comprises (A) an acrylic polymer of $\overline{M}w$ ranging from 5,000 to about 30 million, (B) a polybasic acid and, if desired a (C) soil wetting agent.

(A) Acrylic Polymers

The acrylic acid copolymers employed in the present invention include those of acrylic acid and one or more of unsaturated aliphatic carboxylic acids such as 2-chloroacrylic acid, 2-bromoacrylic acid, maleic acid, fumaric acid, itaconic acid, methacrylic acid, mesaconic acid or the like or unsaturated compounds copolymerizable with acrylic acid, for example, acrylonitrile, methyl acrylate, methyl methacrylate, vinyl acetate, vinyl propionate, methyl itaconate, styrene, 2-hydroxylethyl methacrylate, etc.

Polyacrylic acid or acrylic acid copolymer employed in the present invention has a weight average molecular weight of from 5,000 to about 30 million, preferably about 1 to 5 million. The amount of acrylic polymer present in the mixture with the polybasic acid ranges from 2 to 50, preferably 3 to 10, optimally about 4, parts by weight per weight part of polybasic acid. The molecular weight is measured as weight average molecular weight by gel permeation chromatography up to about 50,000 and by viscometry for higher molecular weights.

(B) Polybasic Acid

The polybasic acids used in the present invention include organic acids containing at least two carboxyl groups in the molecule, for example, citric acid, maleic acid, tartaric acid, itaconic acid, aconitic acid, tricarballylic acid or the like and salts thereof including sodium, potassium, ammonium and lithium as well as iron, cobalt, nickel, and the like cations which form salts, preferably water soluble or dispersible, of the polybasic acids described herein.

The presence of the polybasic acid in the formulation of the invention enhances the consolidation of the soil treated by said formulation by chemical and/or physical means not fully understood. The combination of acrylic polymers and polybasic acids is said to be useful as an aqueous setting solution for dental glass ionomer cements comprising 45 to 60% of polyacrylic acid or acrylic acid copolymer and 7 to 25% of one or more of polybasic acids based on the total weight (see U.S. Pat. No. 4,089,830).

(C) Soil Wetting Agent

Under conditions where the formulation of the invention fails to properly wet the soil surface (tends to bead up on the surface), it is useful to incorporate at least a soil wetting amount, preferably 0.001 to 1 wt%, of a soil wetting agent which is an amount effective to formulation wet the particles of the soil to be consolidated according to this invention.

Representative soil wetting agents include nonionic surface active agents such as ethoxylated nonyl phenol and ethoxylated octyl phenol (both of the Igepal® class sold by GAF Corp. of N.Y., N.Y.) and polyethylene oxide monolaurate. A preferred soil wetting agent is nonyl phenol ethoxylated with 10 moles of ethylene oxide.

Soil Stabilization

The formulation of the invention is utilized by a method of treating soil to stabilize the surface thereof against erosion comprising the steps of distributing a soil treating composition comprising an aqueous mixture of (a) homopolymers and copolymers of acrylic acid and salts thereof having a weight average molecular weight ($\overline{M}w$) ranging from 5,000 to about 30 million; (b) a polybasic acid including salts thereof; and (c) a wetting agent, said homopolymers and copolymers of (a) having a weight ratio based on the weight of (b) ranging from 2 to 50, said water being from 80 to 99.9, preferably 90 to 99.9, weight percent of the total composition into the surface layer of said soil and thereafter drying said surface layer. The concentrate or composition can be diluted up to 1 part of the formulation to 100 parts of water but more likely at a dilution rate of 1 part of formulation to 10 parts of water for soil stabilization against erosion.

The composition of the invention may be distrubuted into the surface layer of the soil in a variety of techniques including spraying (preferred), sprinkling and flooding onto and injecting into a soil surface which if desired can be disturbed as by tilling prior to the treatment.

EXAMPLE 1

A concentrate was prepared by mixing together 20 grams of a polyacrylate emulsion (sold by Rohm & Haas of Philadelphia Penn. as Primafloc A-10 (hereinafter A-10) with 20% active and a molecular weight about 1 million), 1 gram of sodium citrate and 0.1 gram of a nonionic surfactant (nonylphenol with 10 moles of ethylene oxide) in 78.9 g water. The concentrate was added to water in a weight ratio of 1:1 and the whole mixed with agitation to form the spray solution which was tested for dust control and soil stabilization as reported in an evaluation, the results of which are set forth in Example 2.

EXAMPLE 2

(a) Dust Control

The spray solution of Example 1 was sprayed onto a stretch of an unimproved construction road at rate of 0.5 gallons per square yard. After 6 days of light and heavy vehicular traffic the following results were obtained: Using an open bottom box of 1 foot square (placed on the road surface to provide a sample sit) all surface dust and particulate matter was collected from the surface enclosed by the box using a soft brush and dust pan. The collected sample was sieved through a 200 mesh screen and weighed. Samples were taken from 3 separate spray treated road surfaces and from 3 non-treated separate road surfaces in order to evaluate the dust control property of the spray of the invention. The results were:

|  | gram dust/ft$^2$ (ave.) |
|---|---|
| Control (untreated surface) | 26.4 |
| Sprayed Surface (treated with spray of Ex. 1) | 1.0 |

(b) Soil Stabilization

A comparative evaluation of soil treated with the spray formulation of Example 1 and untreated soil was also made by measuring the respective compressive strengths since this is believed directly related to soil stability toward vehicular traffic.

Soil was taken from the subsurface of said construction road at a site where its surface had not been sprayed with the formulation of Example 1 and sieved to 30×0 mesh size.

Sample b1

50 grams of the sieved soil was mixed with 11 grams of the spray formulation of Ex. 1 and molded into pellets 11 mm. in diameter by 20 mm. in height and dried overnight at 85° F.

Sample b2

The sieved soil was mixed with sufficient water to provide an optimal density of wet soil (tends to crumble on pressure), molded into pellets of a size comparable to that of Sample b1 and dried overnight at 85° F. The pellets obtained from Samples b1 and b2 were measured as to compressive strength using an Instron Model 1122 Compression Tester. The results are:

| Sample | lbs/in$^2$ | g/cm$^2$ |
| --- | --- | --- |
| b1 | 340 ± 34 | 1000 ± 100 |
| b2 (blank) | 93 ± 27 | 274 ± 80 |

The results that the compressive strength of soil treated according to this invention is remarkably increased when compared with untreated soil. The combined results of the tests set forth herein indicate that unimproved road surfaces should be markedly strengthened against wear and destruction by vehicular traffic and natural erosion when these surfaces are treated with the formulation of this invention.

EXAMPLE 3

Soil Stabilization

A further comparative evaluation of several soils treated with various spray formulations according to the invention in which the cation was of the poly basic acid was varied and untreated soils was also made by measuring the respective compressive strengths by the procedure as set forth in Example 2. In each case the soil was taken from the subsurface of a roadside at a site where its surface appeared not to have been moderated by any sort of surface spraying and sieved to particles having a 0.59 mm maximum size. In each case the soil was evaluated as to moisture content and sufficient water added to provide an optimum density of wet soil (a final water content which approaches the optimum moisture content as measured by ASTM D-698). For the untreated soil only water was used. For the soil samples treated with the polyacrylate emulsion alone or with the formulations within the scope of the invention containing the polybasic acid salt, the concentrate was appropriately diluted with water to provide the indicated amount of polymer in dry soil when the diluted concentrate was added to the soil at each soil's optimum moisture content. The composition in wt. %s of the concentrate: containing sodium citrate was 50 A-10, 47.5 water and 2.5 sodium citrate ($Na_3C_6H_5O_7$); containing ammonium citrate was 50 A-10, 47.1 water and 2.9 ammonium citrate [$(NH_4)_2H.C_6H_5O_7$]; containing potassium c itrate was 50 A-10, 47.3 water and 2.7 potassium citrate ($KI_3C_6H_5O_7$); containing lithium citrate was 50 A-10 48.2 water and 1.8 lithium citrate ($Li_3C_6H_5O_7$); and, containing citric acid was 50 A-10, 48.4 water and 1.6 citric acid ($H_3C_6H_5O_7$). The above formulations each contain equivalent moles of the indication cation associated with citric acid. The results as set forth in the following Table were produced according to the procedure set forth in Example b2 appearing above.

TABLE

| Example | wt. % polymer in dry soil | Citrate Cation | Source of Soil | lbs/in$^2$ | g/cm$^2$ |
| --- | --- | --- | --- | --- | --- |
| 1 | 0 | — | Colorado | 405 | 28472 |
| 2 | .3 | — | Colorado | 425 | 29878 |
| 3 | .3 | Sodium | Colorado | 710 | 49913 |
| 4 | 0 | — | Louisiana | 460 | 32338 |
| 5 | 0.16 | Sodium | Louisiana | 553 | 38876 |
| 6 | 0.16 | Ammonium | Louisiana | 524 | 36837 |
| 7 | 0.16 | Potassium | Louisiana | 660 | 46398 |
| 8 | 0 | — | Indiana | 260 | 18278 |
| 9 | 0.23 | Hydrogen (Acid) | Indiana | 456 | 32057 |
| 10 | 0.23 | Sodium | Indiana | 422 | 29667 |
| 11 | 0.23 | Ammonium | Indiana | 592 | 41618 |
| 12 | 0.23 | Potassium | Indiana | 542 | 38103 |
| 13 | 0.23 | Lithium | Indiana | 519 | 36486 |

These results show that the compressive strength of soil treated according to this invention is markedly increased when compared to the untreated soil. It is further shown that for reasons not fully understood that the particular type of cation used to form the polybasic salt affects significantly the compressive strength of certain types of soil undefined as to character but defined as to location.

Although this invention has been disclosed with emphasis on soil stabilization against surface erosion while noting the enhanced compressive strength, the formulation beneficially modifies the geotechnical properties of soil materials (mineral based particulate matter) useful in road building and land fill activities. This conclusion is based on the observations that intimately mixing the soil treating formulations of the invention with soil materials from various sources including Columbian soil increases its cohesion, internal angle of friction, density, unconfined compressive strength and aggregation-flocculation properties. It has also been observed that intimately mixing said formulations with spent shale (a soil material derived from the processing of oil shale) results in a significant increase in compressive strength and densification while markedly reducing the moisture required for optimum compaction (as by road building techniques).

The invention in its broader aspect is not limited to the specific details shown and described and departures may be made from such details without departing from the principles of the invention and without sacrificing its chief advantages.

What is claimed is:

1. A method of treating soil comprising the steps of distributing a soil treating composition comprising an aqueous mixture of (a) homopolymers and copolymers of acrylic acid and salts thereof having a weight average molecular weight ($\overline{M}w$) ranging from 5,000 to about 30 million; (b) a monomeric polybasic carboxylic acid including salts thereof; and (c) a wetting agent, said homopolymers and copolymers of (a) having a weight ratio based on the weight of (b) ranging from 2 to 50, said water being from 90 to 99.9 weight percent of the total composition into the surface layer of said soil and thereafter drying said surface layer whereby the geotechnical properties of said surface layer are enhanced.

2. A method according to claim 1 wherein said distributing is by spraying.

3. A method according to claim 1 wherein said distributing is by intimately mixing.

4. A method according to claim 3 wherein said soil is spent shale and said intimately mixing is followed by compaction.

5. A method according to claim 1 wherein said homopolymers and copolymers is a copolymer of ethyl acrylate and methyl acrylic acid having a Mw of from 1 to 5 million and said polybasic acid is citric acid.

6. A method according to claim 1 wherein the wetting agent is nonyl phenol ethoxylated with 10 moles of ethylene oxide.

7. A method according to claim 1 wherein there is included the step of adding sufficient water to the soil to provide the stabilized soil with a final water content for optimum moisture content of the soil as measured by ASTM D-698.

8. A method according to claim 1 wherein said polybasic acid is citric acid, maleic acid, tartaric acid, itaconic acid, aconitic acid or tricarballylic acid.

9. A method according to claim 8 wherein said homopolymers and copolymers is a polyacrylate having a molecular weight of about 1 million.

10. A method according to claim wherein said polybasic acid is present as the sodium, ammonium, potassium or lithium salt thereof.

11. A method according to claim 1 wherein said homopolymers and copolymers is a polyacrylate having a molecular weight of about 1 million and said polybasic acid is present as the sodium salt of citric acid.

* * * * *